(12) United States Patent
Fan et al.

(10) Patent No.: US 7,562,092 B2
(45) Date of Patent: Jul. 14, 2009

(54) SECURED VIEWS FOR A CRM DATABASE

(75) Inventors: Min Fan, Kirkland, WA (US); Edward A. Martinez, Bellevue, WA (US); Tsvi Reiter, Redmond, WA (US); Jasjit Singh Grewal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 11/020,446

(22) Filed: Dec. 22, 2004

(65) Prior Publication Data

US 2006/0136479 A1    Jun. 22, 2006

(51) Int. Cl.
G06F 7/00 (2006.01)
G06F 12/00 (2006.01)
G06F 17/00 (2006.01)
G06F 17/30 (2006.01)

(52) U.S. Cl. ............................ 707/102; 707/9; 707/201
(58) Field of Classification Search ................ 707/9, 707/102, 201
See application file for complete search history.

(56) References Cited

U.S. PATENT DOCUMENTS

| 5,751,949 | A | * | 5/1998 | Thomson et al. | 726/4 |
| 5,787,428 | A | * | 7/1998 | Hart | 707/9 |
| 6,134,549 | A | * | 10/2000 | Regnier et al. | 707/9 |
| 6,516,317 | B1 | * | 2/2003 | Samar et al. | 707/9 |
| 6,581,060 | B1 | * | 6/2003 | Choy | 707/9 |
| 6,820,082 | B1 | * | 11/2004 | Cook et al. | 707/9 |
| 6,976,023 | B2 | * | 12/2005 | Chen et al. | 707/9 |
| 2004/0044655 | A1 | * | 3/2004 | Cotner et al. | 707/3 |

OTHER PUBLICATIONS

European Search Report for EP 05 11 1771 dated Mar. 29, 2006.

* cited by examiner

*Primary Examiner*—James Trujillo
*Assistant Examiner*—Jorge A Casanova
(74) *Attorney, Agent, or Firm*—Marshall, Gerstein & Borun LLP

(57) ABSTRACT

The claims of the present application recite a method and system for accessing information in an otherwise inaccessible application database of a DBMS using view definitions that implement a security protocol.

15 Claims, 6 Drawing Sheets

General Security Checking Procedure

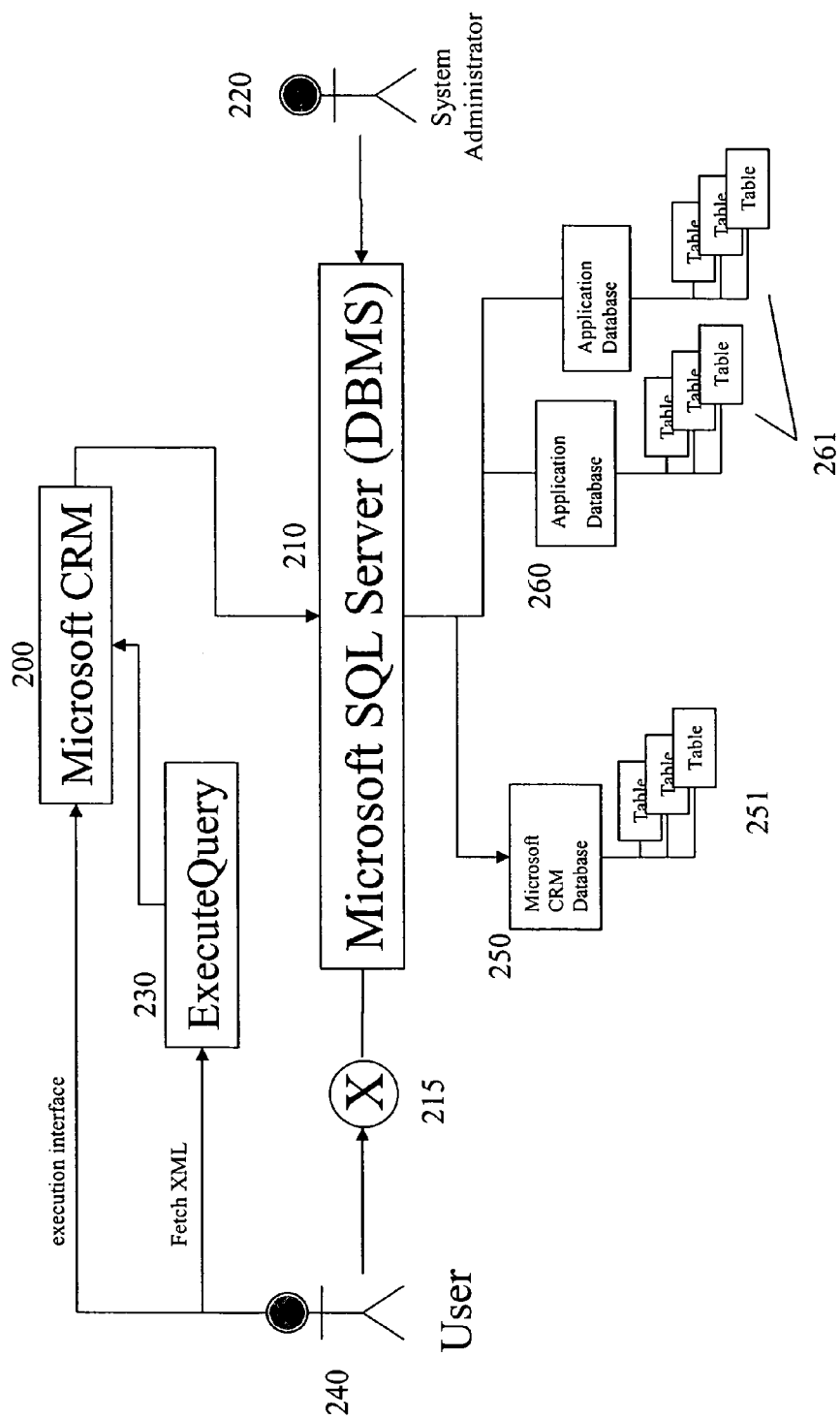
Figure 2 Prior Art CRM DB Access

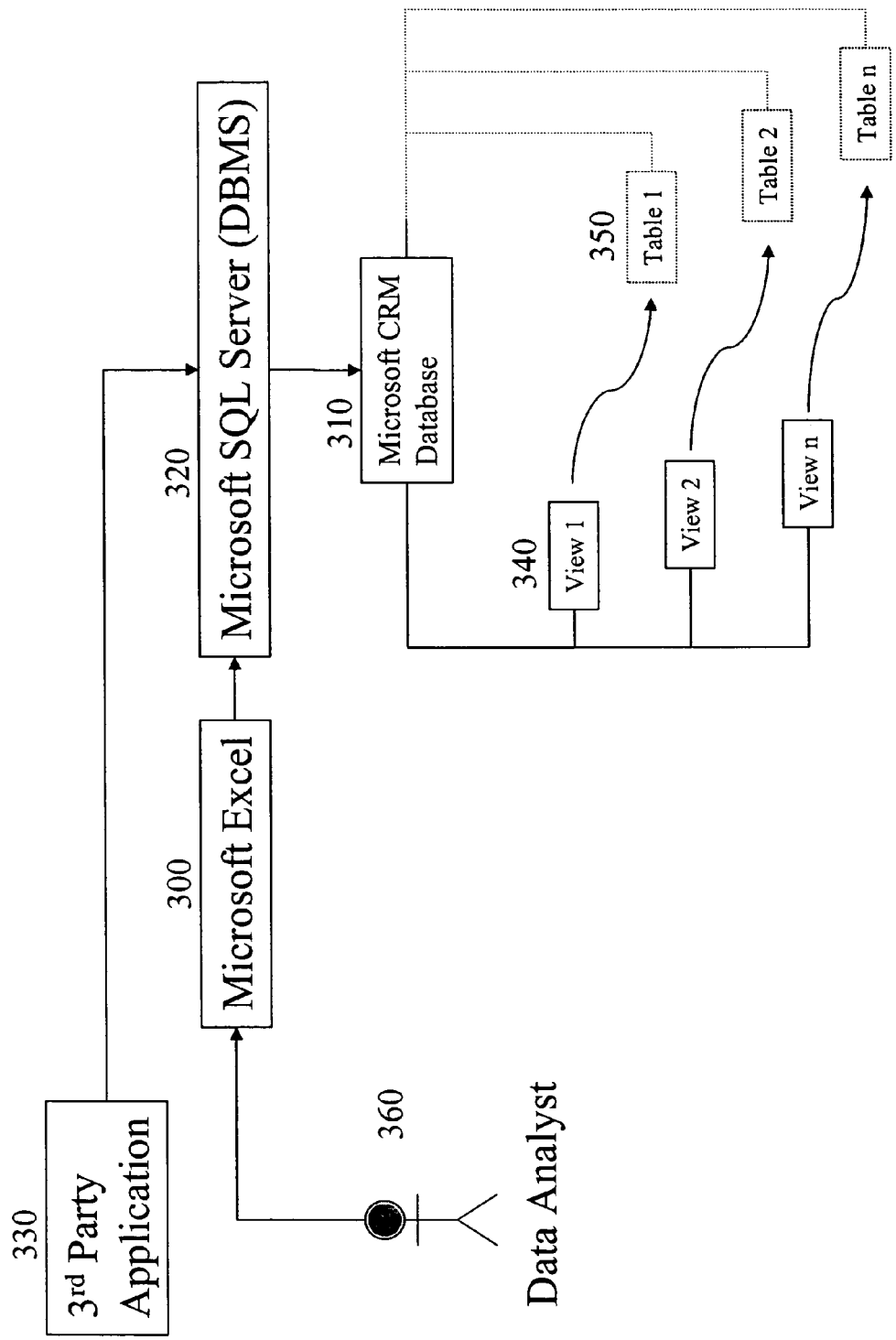

Figure 4 DBMS Parameter Setup

| Access to the DBMS is allowed. | Access to an application database instance is allowed. | Access to database tables is NOT allowed. | Access to database table listing is NOT allowed. | Access to list views is allowed. | Access to view return attributes is allowed. | Access to execute views is allowed. |
|---|---|---|---|---|---|---|

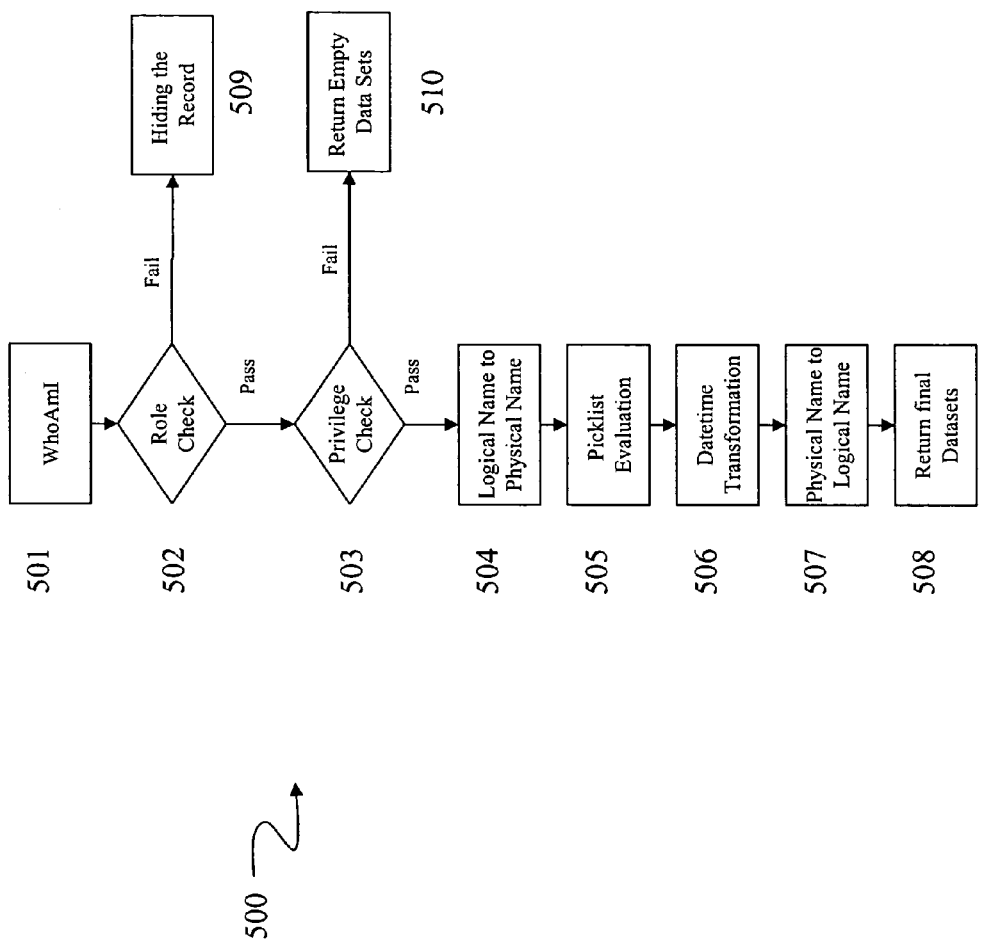
Figure 5 View Definition Flow Chart

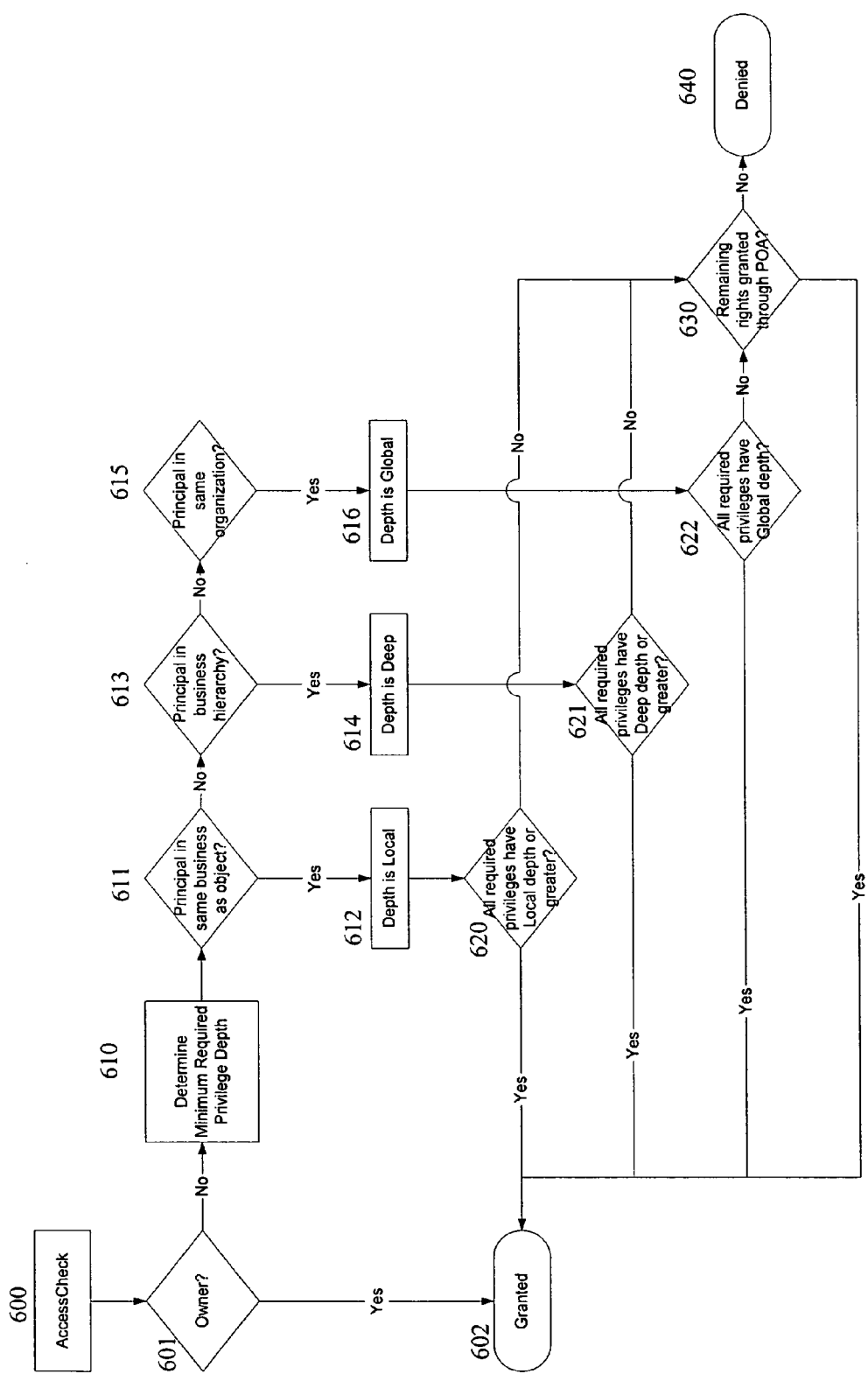
Figure 6. General Security Checking Procedure

SECURED VIEWS FOR A CRM DATABASE

FIELD OF THE INVENTION

The present invention generally relates to methods of providing secure access to database tables in a database management system.

BACKGROUND

In a database management system (DBMS), data is stored in one or more data containers. Each container contains records and the data within each record is organized into one or more fields. In a relational database system, the data containers are referred to as tables, the records are referred to as rows, and the fields are referred to as columns. In object oriented databases, the data containers are referred to as object classes, the records are referred to as objects, and the fields are referred to as attributes. Other database architectures may use different terminology. The claims of the present application are not limited to any particular type of data container or database architecture.

Many applications having extensive data handling requirements often rely on an independent DBMS to help manage application data. Such applications may include business applications, including customer relationship management ("CRM") systems and enterprise resource planning ("ERP") systems. Using a separate, independent DBMS allows application designers to rely on the DBMS to handle complicated bulk data storage functions, while freeing designers to focus on creating application specific functions. In addition to the division of labor benefit, such a dual system model provides a simple and commonly used security framework where security functionality is localized to the application system. For example, many proprietary business applications, including CRM systems using a DBMS, provide access to CRM data only through the CRM system, thereby ensuring that data access and data security are managed through security functions provided by the CRM application. In this model, it is common for the CRM system to implement a closed, private database instance that can only be accessed from the CRM application or by a system administrator for maintenance purposes.

The security model used in prior art systems is shown in FIG. 2. In this security model, the DBMS is setup to deny general access to the application database, allowing only the software system itself to access the database, or perhaps, a system administrator. In this manner, all access to the application system data is controlled by the application.

One reason that security is channeled away from the DBMS and localized within the business application is that the security functionality of a typical DBMS is often unsuited to handle application specific security requirements. For example, Microsoft SQL Server, a DBMS, provides protection of data to the table level only. Many business applications, such as Microsoft CRM, may require specific row-level protection. In row-level security, result sets are returned with hidden or withheld data rows based on a user's role and privileges. CRM systems such as Microsoft CRM commonly perform this row-level security through the application software either using a general software executable or programmatically through application programming interfaces ("APIs").

Another reason that many independent software vendors do not want to utilize DBMS level security is that this may require vendor specific design considerations and support for a particular DBMS. This would make cross-compatibility of the software more difficult to implement. In a system in which database security is channeled through the application software itself, there would be much less consideration for the specific DBMS being used with an application.

While this common security system makes it convenient for CRM system designers to implement localized security, there is often a desire or need to perform analysis on the data stored in an application database that the application itself is not suited, or designed, to perform. In the example of a CRM system, such as Microsoft CRM, there may be a desire to analyze customer data for trends, marketing patterns, demand statistics, budgeting considerations, operating considerations, etc., that the CRM system is not designed to perform. Moreover, there is also no convenient way of sharing Microsoft CRM data with other related business applications, such as enterprise resource planning ("ERP") applications.

Under the existing security model, one option for providing access to the CRM data is to design an interface to the CRM system for extracting necessary data through the CRM system. This can be done by providing APIs to a user to retrieve the data via the CRM system. However, depending on the CRM system, this procedure can be excruciatingly time consuming and complex, as one would need to be adept at programming code to communicate through the application interface. This approach is not a process many data analysts would be suited to perform.

Many applications, including the Microsoft suite of office products, e.g. Microsoft Word, Microsoft Excel, Microsoft PowerPoint, etc., are able to access any DBMS supporting SQL and ODBC. Thus, another more convenient option for providing access to a Microsoft CRM database is to open the database for access to a group of users via the DBMS. However, as mentioned above, a DBMS usually only allows protection down to the table level and does not allow for micro-level protection of row specific information in the tables. A particular business may not want data analysts to see all the row data but only a subset of the rows. If this option were to be implemented, additional business process changes may need to be made in terms of changing employee business roles and creating new business roles, something that many independent software vendors ("ISVs") would not like to burden consumers with. Moreover allowing an open database connection would increase the risk of corruption of application data which could greatly harm a business. While opening the database to a system administrator would be reasonable, opening a database for full access to a group of data analysts creates problems in security that would make a database such as a CRM database susceptible to compromise.

Therefore, there is a need for an improved method and system of accessing data in a secured application database via the DBMS without compromising the security intentions of the secured application.

SUMMARY

The claims of the present application recite a method and system for accessing information in an otherwise inaccessible application database of a DBMS using view definitions that implement a security protocol. While the specific method and system will be described to apply to a CRM system embodiment, specifically, Microsoft CRM, it is emphasized that this system may be applied to other secure application databases as well.

The claimed method and system may be a tiered security access model in which the DBMS is set to allow discrete access to a CRM database. Users may log on to a DBMS using, for example, an integrated DBMS-operating system authentication protocol and obtain access to an instance of an application database. However, further access to objects contained in the database is restricted to database views. Moreover, this model may only allow for accessing the views to obtain a listing of view identifiers, to obtain a listing of view attributes, and to execute the views.

The view acts as a secured proxy to a particular table of the database for which it corresponds. Furthermore, security is enabled in a relatively easy way by attaching to the view, simple query conditions that match user role and user privilege to table-row associations and privileges. Additionally, because access is being performed via the DBMS, no further interface methods need to be coded to provide interoperability with secondary applications used to process the CRM data. In this way, efficient data base extraction and query filtering may be performed without the need for code savvy data analysts.

BRIEF DESCRIPTION OF THE DRAWINGS

FIG. 2 illustrates a common configuration for an existing CRM-DBMS model using Microsoft CRM and Microsoft SQL Server;

FIG. 3 illustrates an embodiment of the claimed system;

FIG. 4 illustrates a possible set of security parameters for the DBMS in order to implement the method and system of the claims;

FIG. 5 illustrates a flow chart of a view definition for an embodiment of the claims; and FIG. 6 illustrates a security procedure implemented using the secured views.

DETAILED DESCRIPTION

Figure 1:
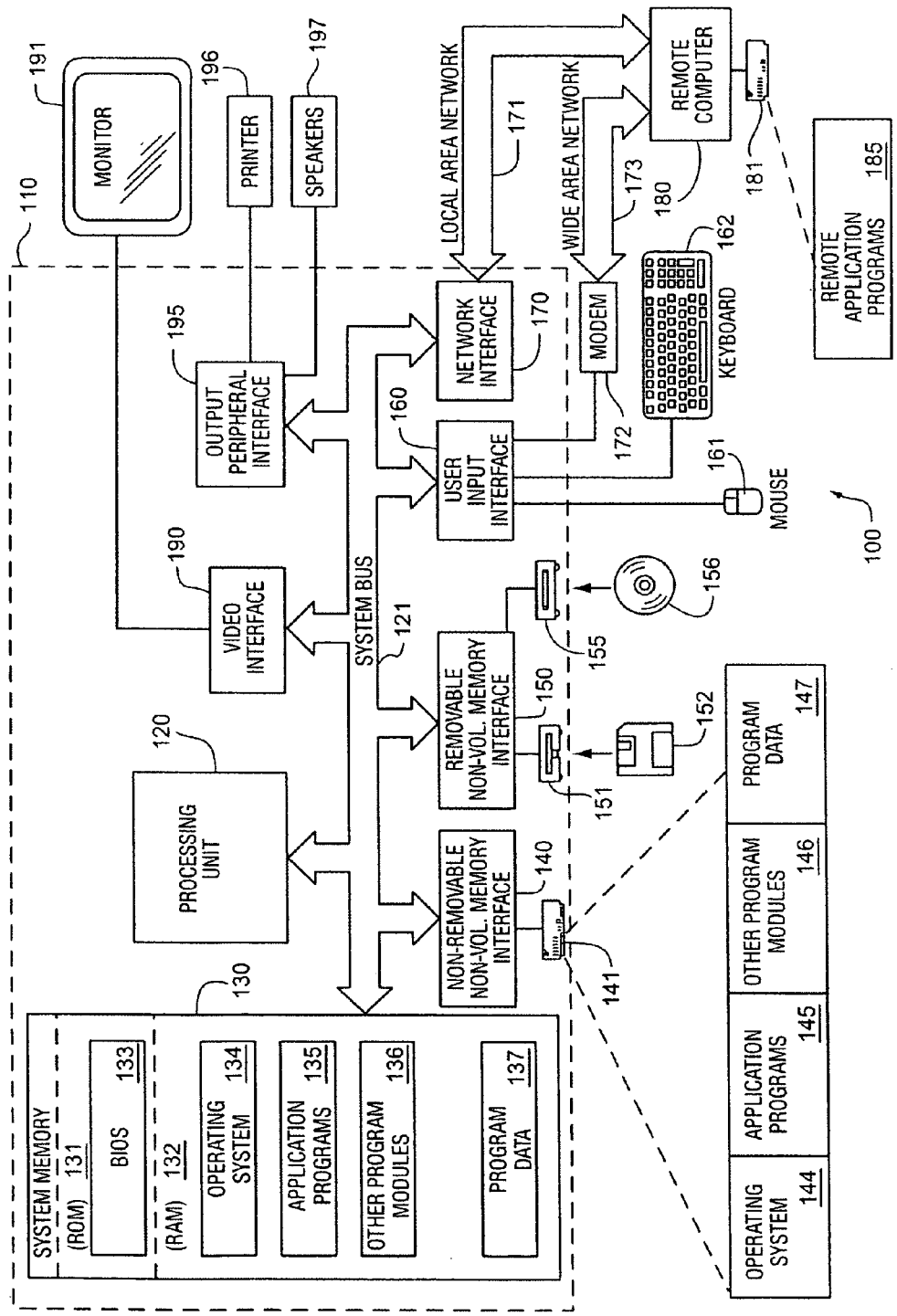
FIG. 1 illustrates a block diagram of a computing system that may operate in accordance with the claims.

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

FIG. 2 illustrates a common configuration for an existing CRM-DBMS model using a Microsoft CRM system 200 and Microsoft SQL Server 210. Currently, Microsoft CRM denies all access to the CRM database via the DBMS, as shown by block 215, except for access by the Microsoft CRM system 200 itself or a system administrator 220 authorized to manage the DBMS. Microsoft CRM does provide, however, one additional means for accessing data to the Microsoft CRM database in addition to its user interface. This access is accomplished using a Microsoft CRM application programming interface ("API") called ExecuteQuery 230 that uses Fetch XML, an XML formatted, query command code. A user 240 may write Fetch XML commands and send these commands to ExecuteQuery 230. ExecuteQuery may then interpret the Fetch XML query commands, access the Microsoft CRM database 250, and return a result set. While this method appears to bypass the security of the CRM-DBMS structure, the API actually performs Microsoft CRM-based security filtering on the query commands before providing a result set. As noted above, typical users are not usually well equipped to write application level code in order to extract data from applications. Even with the ExecuteQuery interface 230, writing Fetch XML is complicated and time consuming.

FIG. 2 further illustrates Microsoft SQL Server 210 managing several databases 250, 260 containing sets of database tables 251, 261. Often, a separate database instance may be used to house a set of tables for a particular application. In the example of a Microsoft CRM system 200, the DBMS 210 may have one database designated for use as an Microsoft CRM database 250, which may store most of the data related to the CRM system such as customer information and various task information related to the CRM system. A DBMS may manage several databases and only have one application database implement the claimed method and system. For the CRM database 250, FIG. 2 illustrates that for a general user 240, access is blocked to the CRM database 250 and that all access to the CRM data must be done via the CRM system 200, either via an executable or programmatically through an API, such as ExecuteQuery 230.

An embodiment of a business process of the claims may be illustrated in FIG. 3, which illustrates the use of Microsoft Excel 300 accessing a CRM database 310. Microsoft Excel is a common tool for analyzing application data. Because the Microsoft suite provides connection capabilities to any DBMS using SQL and ODBC, Microsoft Excel may connect to a Microsoft SQL Server 320 and subsequently connect to a Microsoft CRM database 310. In fact, many third party systems 330 that provide connection capabilities to a DBMS using SQL and ODBC may connect to Microsoft SQL Server 320. Microsoft Excel may then query for available views 340, which correspond to particular CRM tables 350, and request information. Moreover, this request may provide row filtered results based on role and privilege information of a user 360. Prior art systems may continue to require either a completely open database, or a custom interface into the CRM system itself. Also, prior art systems may not provide the unique row-filtering capabilities of certain embodiments of the claimed system, where rows may be filtered based on roles and privileges assigned to the particular user and row.

FIG. 3 may also illustrate that a CRM database 310 has a set of corresponding views 340 for a set of tables 350. Each table 350 may be secured against users logged on to the database through the DBMS. Moreover, each table 350 may in fact be hidden from general users 360 to increase security (illustrated by dotted lines). The view 340 may act as a proxy for access to the database tables 350. It should be noted that while the views 340 are able to be seen, their actual definitions may be protected in order to prevent users from discovering the implementation of the view. In some instances, it may be appropriate to limit access to the views to: enabling a listing of available views, a listing of parameters for view execution, and execution privileges for executing a chosen view.

FIG. 4 may illustrate the parameter settings for a DBMS in order to implement an embodiment of the claims. These parameter settings may be user-specific and may be changed by a system administrator depending on a particular situation. For example, there may be times when the system administrator will allow a business developer to modify the definition of the view, in which case the business developer will be given modification privileges. In other situations, it would may not be appropriate to provide any additional privileges than the settings listed in FIG. 4. For example, a salesperson would probably never be given the right to modify the view definition because this would allow the salesperson to view unauthorized data relating to other salespersons. It should be noted that while these settings apply to most DBMS users, the system administrator typically has full access to the database and database objects, including both the tables and views.

FIG. 5 illustrates a flow chart 500 for a view definition of an embodiment of the claims. In this flow chart, a security routine 501 may check roles 502 and privileges 503 for the data. If a privilege check 503 fails, a record may be returned with empty data sets. Failing a role check 502 may result in hiding a record 509 altogether. Also, in addition to the security filtering, the view may implement a pick list transformation 505, a mapping of physical column names to logical database names 504, 507, and date-time transformations 506, to make it easier for data analysts to work with the datasets 508. A date-time transformation may be used to take a date or time attribute of the table that has one format and transform into a second format, such as an application-based format. A picklist transformation may be used to provide a descriptive string to a picklist value. For example, a picklist transformation of a shipping action list would transform database picklist values such as 0, 1, 2, 3 into FedEx, UPS, USPostMail, etc. Also, a mapping of physical column names to logical database names may allow for user-friendly names to be assigned to column specific names used in a database naming schema.

CRM systems may integrate a business hierarchy into its security implementation and often include fields in their data entities that correspond to an owner and a business unit. An operating system, such as Microsoft Windows, may also contain a hierarchical structure affiliating user roles with groups, where the roles have a set of privileges. In an embodiment of claims, the secured views may be designed to return rows based on a hierarchical ownership structure that leverages an existing CRM application and operating system environment. This potential security checking model is illustrated in FIG. 6. A SQL statement implementing the security model is further described below, where a user may be an owner of a record, and thus a user ID may be contained in an owner attribute of the record. Access checking procedure 600 first determines if the user is an owner of the object, as illustrated in block 601. If so, then the user has complete access in block 602. If the user is not an object owner, routine 610 determines the required privilege depth to access the object based on the object's ownership affiliation. If the user and object belong to the same business unit, block 611, then the minimum depth is Local 612. If the object's owning business unit is the same as the user's business unit, block 613, then the minimum required depth is Deep 614. If the object is in the same organization as the user, block 615, then the minimum required depth is Global 616. Once the minimum privilege depth is calculated, blocks 620, 621, and 622 check to see if the user's privileges have the minimum required depth. If the user's privileges have minimum required depth or greater, as determined in blocks 620, 621, and 622, access is granted in block 602. If not, routine 600 then determines, in block 630, if the object is explicitly shared to the user or a team of which the user is a member. If so, then access is granted in block 602, otherwise access is denied in block 640.

The privilege depth illustrated in FIG. 6 is categorized as basic, local, deep, or global. A user with a basic privilege depth has rights to any objects that are owned by that user, shared to that user, or shared to a team of which the user is a member. A user with a local privilege depth has rights of a basic privilege depth and also has rights to any objects that are in the user's business unit. A user with a deep privilege depth has rights of a local privilege depth and also has rights to any objects that are in sub-businesses of the business-unit to which the user belongs. This includes sub-businesses at any depth, not just an immediate level sub-business, and thus, includes sub-businesses of sub-businesses. A user with a global privilege depth has rights to any objects in the user's organization (and thus global is a superset of all the other privilege levels).

A SQL statement that may be used to implement the security process of FIG. 6 is shown below:

```
SELECT [Account columns to retrieve]
FROM Account
WHERE
(
    -- object owned by the user
    Account.OwningUser = [Current User ID]
        or
    -- object owned by business unit of user - local access
    Account.OwningBusinessUnit = [Current User Business ID]
    -- role based access
        or
    -- deep access
        (Account.OwningBusinessUnit in Select biz.SubBusinessId from
BusinessUnitMap as biz where biz.BusinessId = u.BusinessUnitId) and PrivilegeDepth =
[Deep]
        or
    -- global access
        (Account.OwningBusinessUnit in Select org.SubBusinessId from
OrganizationMap org where org.OrganizationId = u.OrganizationId) and PrivilegeDepth =
[Global]
        or
)
    -- object shared to the user
    or
    Account.AccountId in
    (
      select POA.ObjectId from PrincipalObjectAccess POA
      join SystemUserPrincipals sup on POA.PrincipalId = sup.PrincipalId
        where sup.SystemUserId = [Current User ID] and
          POA.ObjectTypeCode = 2 AND
          (POA.AccessRightsMask & 1) = 1
    )
```

Unlike existing security models that use a security descriptor field to provide bulk instructions for API-based security processing, the present claims may rely on a security model that only references discrete ownership attributes of each database object, attributes that are often already part of the general attribute structure of the object. As described above, security privileges may be processed in sets that are based on ownership affiliations. In this way, processing may be faster. Furthermore, because the security model of the claimed method and system processes the rows completely in a DBMS, rather than relying on an API, processing may be faster because a dedicated DBMS processing internal instructions will most often be faster than an API retrieving a set of rows over a communication channel and interpreting a large security descriptor.

In addition, users of a CRM-DBMS system may now interface with database tables via virtual tables provided by the secured views. Users may perform data analysis with a host of other analysis tools that are compatible with SQL-ODBC drivers using a security system integrated with the operating system. It provides seamless integration for application suites like Microsoft Office because a user can now use a tool like a query wizard to open views, similar to opening a database table, without the user needing to be aware of the underlying implementation.

As an example, a user could use secured views to import CRM related data into a spreadsheet program such as Excel where numerous statistical operations may be performed on the data. This may be accomplished without knowing any computer coding language because a simple pop-up query wizard type tool may be used. In addition, the importation may be accomplished without having to proceed through a separate security procedure to access the database because the security is localized to the DBMS. Finally, the importation and analysis may be accomplished without modifying the underlying data in the database by operating on a view of the data rather than the actual data.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments may be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A computer storage medium storing computer-executable instructions for execution by a processor that creates secured views for a database comprising:
   creating a database comprising at least one database table and at least one database view, wherein the database table has a row ID, a row business unit, and a row owner;
   providing a user access to execute the database view while preventing the user from viewing and directly accessing the database table, wherein the user has an associated user ID, an associated user business unit, an associated user business group, and an associated privilege depth and wherein the user ID and the user business unit correspond to an operating system defined user ID and user business unit and a customer relationship management application defined user ID and user business unit; and
   performing sequential determinations including:
   1) determining whether the user is an owner of the row by determining if the value of the row ID is the user ID; and 2) determining whether a business unit of the row is the user business unit by determining if the row business unit is the user business unit and whether the privilege depth is local; and 3) determining whether the business unit of the row is contained in a set of business units associated with the user business unit, where the user business unit is a member of the set of business units and whether the privilege depth is deep; and 4) determining whether the business unit of the row is among a set of business units associated with the user business group in addition to determining whether the privilege depth is global, wherein the privilege depth values of local, deep, and global are separate and distinct values and indicate security access to a user business unit level, an associated user business unit level, and a user business group level, respectively; and 5) determining whether the row ID is associated with the user ID other than determining whether the user is the owner of the row; and configuring the at least one database view to select a row based on the determinations.

2. The computer storage medium of claim 1, further comprising performing a database lookup to obtain the user ID, the user business unit, the user business group, the privilege depth, the row ID, the row business unit, and the row owner.

3. The computer storage medium of claim 1, further comprising searching a cache to obtain at least one of the set comprising the user ID, the user business unit, the user business group, and the privilege depth while performing a database lookup to obtain at least one of the set comprising the row ID, the row business unit, and the row owner.

4. The computer storage medium of claim 1, further comprising assigning a privilege to a user to view and access the database view.

5. The computer storage medium of claim 1, further comprising assigning no privilege to a user to view and access the database table.

6. The computer storage medium of claim 1, further comprising configuring the view to be listed in a SQL list view command.

7. The computer storage medium of claim 4, wherein the privilege comprises allowing a user to view a listing of the view.

8. The computer storage medium of claim 4, wherein the privilege comprises allowing a user to execute the view.

9. The computer storage medium of claim 4, wherein the privilege comprises allowing a user to determine a set of attributes of the view.

10. The computer storage medium of claim 1, further comprising performing at least one of a picklist evaluation on the selected rows, a date-time transformation on the selected rows, a logical name to physical name transformation on the view parameters, and a physical name to logical name transformation on the selected rows.

11. The computer storage medium of claim 1, further comprising returning an empty set if the user does not have the required privilege depth.

12. The computer storage medium of claim 1, further comprising returning a null set if the user does not have a known user ID.

13. The computer storage medium of claim 1, further comprising using a database management system to control access to the database table and views.

14. The computer storage medium of claim 1, further comprising sending a result of the view to a non-database application via a connection with the database management system.

15. The computer storage medium of claim 14, wherein the non-database application is a spreadsheet program.

* * * * *